United States Patent
Lilley et al.

(10) Patent No.: US 11,257,281 B2
(45) Date of Patent: Feb. 22, 2022

(54) SYSTEMS AND METHODS FOR ADAPTIVE VISUAL AND TEMPORAL QUALITY OF TIME-DYNAMIC (4D) VOLUME RENDERING

(71) Applicant: Cesium GS, Inc., Philadelphia, PA (US)

(72) Inventors: Ian Lilley, Philadelphia, PA (US); Sean Lilley, Philadelphia, PA (US); Patrick Cozzi, Drexel Hill, PA (US)

(73) Assignee: CESIUM GS, INC., Philadelphia, PA (US)

( * ) Notice: Subject to any disclaimer, the term of this patent is extended or adjusted under 35 U.S.C. 154(b) by 0 days.

(21) Appl. No.: 17/372,344

(22) Filed: Jul. 9, 2021

(65) Prior Publication Data
US 2022/0012937 A1  Jan. 13, 2022

Related U.S. Application Data

(60) Provisional application No. 63/050,514, filed on Jul. 10, 2020.

(51) Int. Cl.
*G06T 15/08* (2011.01)
*G06T 15/00* (2011.01)
*G06T 15/10* (2011.01)
*G06T 15/04* (2011.01)

(52) U.S. Cl.
CPC ............ *G06T 15/08* (2013.01); *G06T 15/005* (2013.01); *G06T 15/04* (2013.01); *G06T 15/10* (2013.01)

(58) Field of Classification Search
CPC ....... G06T 15/005; G06T 15/04; G06T 15/08; G06T 15/10
See application file for complete search history.

(56) References Cited

U.S. PATENT DOCUMENTS

| | | |
|---|---|---|
| 2015/0262416 A1* | 9/2015 | Hecht .................... G06T 15/08 345/424 |
| 2018/0310025 A1* | 10/2018 | Keranen ............... G06T 17/005 |

(Continued)

OTHER PUBLICATIONS

Díaz, Jose, Fabio Marton, and Enrico Gobbetti. "Interactive spatio-temporal exploration of massive time-varying rectilinear scalar volumes based on a variable bit-rate sparse representation over learned dictionaries." Computers & Graphics 88 (Mar. 2020): 45-56 (First available online Mar. 2020). (Year: 2020).*

(Continued)

*Primary Examiner* — Daniel F Hajnik
(74) *Attorney, Agent, or Firm* — The Marbury Law Group, PLLC

(57) ABSTRACT

Systems, methods, devices, and non-transitory media of various embodiments enable rendering of a time-dynamic (4D) volume dataset. Various embodiments may provide a method for responsive and high quality rendering of time-dynamic hierarchical level-of-detail voxel datasets. Various embodiments may provide a prioritization system that balances visual quality and temporal responsiveness even with slow network or filesystem speeds. Various embodiments may provide a compact and efficient storage format for time-dynamic and mixed-resolution voxel rendering on a graphics processing unit (GPU).

27 Claims, 12 Drawing Sheets

(56) References Cited

U.S. PATENT DOCUMENTS

2019/0116352 A1* 4/2019 Pesonen ................ H04N 13/15
2019/0188899 A1* 6/2019 Moloney ................ G06T 17/05

OTHER PUBLICATIONS

Kämpe, Viktor, et al. "Exploiting coherence in time-varying voxel data." Proceedings of the 20th ACM SIGGRAPH Symposium on Interactive 3D Graphics and Games. 2016. (Year: 2016).*

Steinbrucker, Frank, Christian Kerl, and Daniel Cremers. "Large-scale multi-resolution surface reconstruction from RGB-D sequences." Proceedings of the IEEE International Conference on Computer Vision. 2013. (Year: 2013).*

* cited by examiner

Texture Atlas
(x = empty)

| 0 | 1 | 2 | 3 |
|---|---|---|---|
| 4 | 5 | 6 | 7 |
| 8 | 9 | X | X |
| X | X | X | X |

FIG. 4

Random Selection Priority

Temporal Priority

SYSTEMS AND METHODS FOR ADAPTIVE VISUAL AND TEMPORAL QUALITY OF TIME-DYNAMIC (4D) VOLUME RENDERING

RELATED APPLICATIONS

This application claims priority to U.S. Provisional Application No. 63/050,514 filed on Jul. 10, 2020 entitled "Systems and Method for Adaptive Visual and Temporal Quality of Time-Dynamic and N-Dimensional Volume Rendering," the entire contents of which are hereby incorporated by reference.

GOVERNMENT SUPPORT STATEMENT

This invention was made with Government support under Agreement No. N66604-18-9-0001, awarded by the Naval Undersea Warfare Center. The Government has certain rights in the invention.

BACKGROUND

Computer graphics, and especially three-dimensional (also referred to simply as "3D" herein) visualization, is a rapidly developing computing technology finding new applications in many different industries. Volume rendering is a set of techniques for visualizing 3D data on a two-dimensional (also referred to simply as "2D" herein) display, and has many uses in scientific computing such as Magnetic Resonance Imagining (MRI) scans, weather forecasts, fluid simulation, etc. One challenge faced in volume rendering includes the size of the datasets being so large as to not fit in a computing device's memory all at once. Another challenge faced in volume rendering includes network or filesystem capacity limits in providing data of a dataset with sufficient speed to a requesting computing device. A prioritization system that balances visual quality and temporal responsiveness, even with slow network or filesystem speeds, would be beneficial to support volume rendering.

SUMMARY

The systems, methods, devices, and non-transitory media of the various embodiments enable rendering of a time-dynamic (4D) volume dataset. Various embodiments may provide a method for responsive and high quality rendering of time-dynamic hierarchical level-of-detail voxel datasets. Various embodiments may provide a prioritization system that balances visual quality and temporal responsiveness even with slow network or filesystem speeds. Various embodiments may provide a compact and efficient storage format for time-dynamic and mixed-resolution voxel rendering on a graphics processing unit (GPU).

Various embodiments may include a method for rendering at least a portion of a time-dynamic (4D) volume dataset on a two-dimensional (2D) display, such as a method performed by a processor of a computing device for rendering a 4D volume dataset on a 2D display of the computing device. The method may include requesting one or more keyframe nodes associated with one or more spatial nodes in a sparse voxel octree of the 4D volume dataset based at least in part on a keyframe node prioritization, wherein the keyframe node prioritization is based at least in part on a screen-space-error (SSE) priority value, a temporal priority value, and a random selection priority value, storing received keyframe node data in a three-dimensional (3D) texture atlas storing voxel data of the 4D volume dataset, populating an array encoded sparse voxel octree of spatial nodes to be rendered with two keyframe nodes per spatial node to be rendered from the 3D texture atlas, and sending the array encoded sparse voxel octree for rendering on the 2D display Various embodiments include a device including a processor configured with processor-executable instructions to perform operations of any of the methods summarized above. Various embodiments also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 4 is an illustrative example of a populated texture atlas according to various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

3D data, such as 3D data stored in voxel grids, may have many uses in scientific computing such as Magnetic Resonance Imaging (MRI) scans, weather forecasts, fluid simulation, etc., but can be difficult to render, especially when rendering requires sending the 3D data over a network, due to the amount of data associated with the 3D objects.

Figure 1:
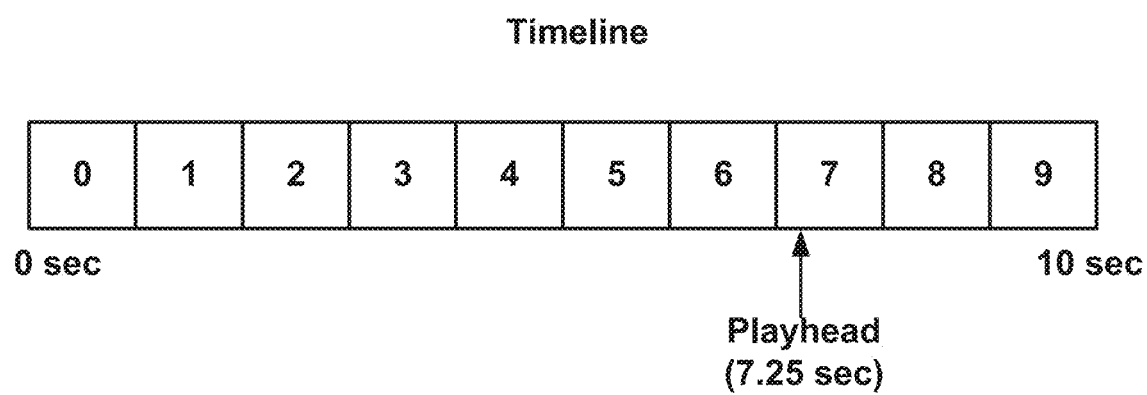
FIG. 1 is an illustrative example of a timeline and playhead position.

Volume rendering is a set of techniques for visualizing three-dimensional (3D) data on a two-dimensional (2D) display. A time-dynamic (4D) volume dataset is a collection of timestamped 3D voxel grids, or keyframes, arranged in a sequence. At runtime (i.e., runtime for rendering the 3D data to the 2D display) all of the timestamps are mapped to a timeline which contains a playhead that has some access pattern, such as moving continuously from start to finish (forward access) or controlled by the user (random access). For example, FIG. 1 illustrates a ten second timeline in which the playhead location is at 7.25 seconds. The sequence of the timestamps may enable the 3D data of the 4D volume dataset corresponding to the point in the timeline at which the playhead location is located to be rendered on the 2D display.

Figure 2:
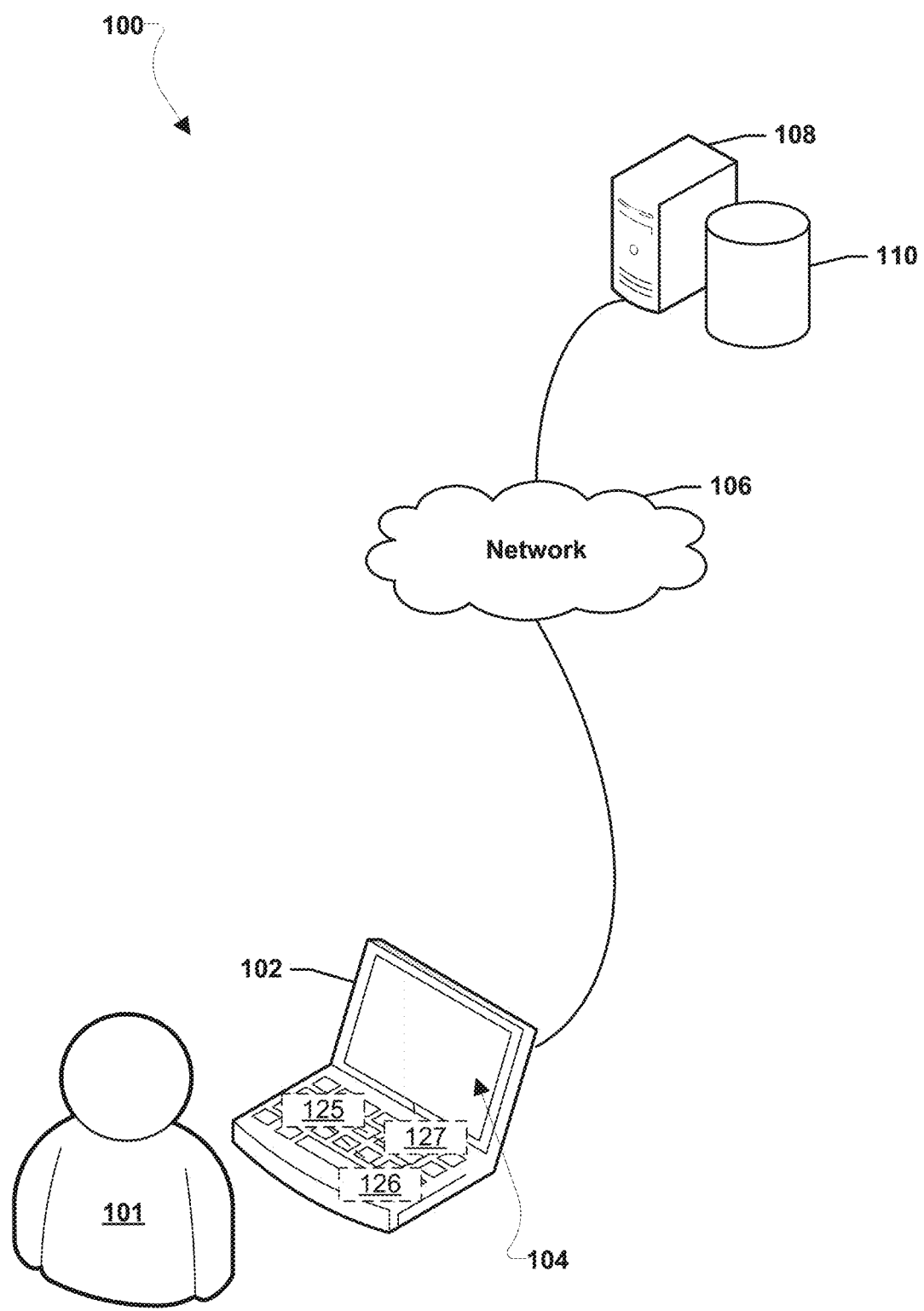
FIG. 2 is a block diagram of an example system suitable for use with the various embodiments.

With reference to FIGS. 1-2, FIG. 2 is a block diagram of an example system 100 suitable for use with the various embodiments. The system 100 may include multiple devices, such as a server 108 and computing device 102 connected to a network 106.

The server 108 may include a memory 110 storing data associated with one or more 4D models (e.g., groups of timestamped 3D models), such as 4D data stored in voxel grids, hierarchical level of detail (HLOD) tile sets, metadata describing the HLOD tile sets, etc. The data associated with the one or more 4D models may be massive datasets. The massive 4D models (e.g., the grouping of timestamped 3D models) stored in the memory 110 of the server 108 may be organized into HLODs. A node in an HLOD that represents a large 4D model may have or be linked to data needed to render the portion of the model for which the node corresponds.

The server 108 may be connected to a network 106, such as a Wide Area Network (WAN), a Local Area Network (LAN), and/or the Internet, and may exchange data via the connection to the network 106 with other computing devices connected to the network 106, such as computing device 102. The connections of the server 108 and/or computing device 102 to the network 106, may be wired and/or wireless connections.

The computing device 102 may request data associated with one or more 4D models (e.g., the grouping of timestamped 3D models) from the server 108 via the network 106 and may receive data associated with the one or more 4D models from the server 108 via the network. Using the received data, the computing device 102 may render one or more portions of a 4D model (e.g., one or more portions of the grouping of timestamped 3D models corresponding to the current playhead location) on a screen (or display) 104, such as a 2D screen (or display), visible to a user 101 of the computing device 102 (also referred to as a rendering computing device 102).

The computing device 102 may include various components, such as various processors (e.g., an applications processor 125, a graphics processing unit (GPU) 127, etc.), various memories (e.g., a memory 126), the screen (or display) 104, such as a 2D screen (or display), etc. The various components (e.g., applications processor 125, GPU 127, memory 126, and/or display 104) may be interconnected with one another, for example by various bus interconnects or other type connections, and the various components (e.g., applications processor 125, GPU 127, memory 126, and/or display 104) may exchange data with one another. The memory 126 of the computing device 102 may store data associated with one or more 4D models (e.g., groups of timestamped 3D models), such as 4D data stored in voxel grids, SVOs, HLOD tile sets, metadata describing the HLOD tile sets, min-max heap data structures, tables, lists, etc. The various components (e.g., applications processor 125, GPU 127, memory 126, and/or display 104) may receive data associated with the one or more 4D models from the server 108 via the network 106.

3D data is commonly stored in a voxel grid where each voxel stores a value at a discrete point in a regular grid. For very large 3D datasets, a voxel grid can be too large to fit into a rendering computing device's memory (e.g., memory 126) all at once, so the 3D data may be broken up into same-sized chunks called tiles. For example, the tiles may be cubes of voxels, such as 16×16×16 voxels, 32×32×32 voxels, etc. The breaking of the 3D dataset into a number of tiles may enable the rendering computing device (e.g., 102) to only request tiles from a network or filesystem (e.g., server 108 and memory 110 via network 106) that are visible to the virtual camera at a given time.

Similarly, it's ideal to render tiles whose voxels project to a single pixel, or some other user defined threshold, called the screen-space-error (SSE). Otherwise, the voxel data will be oversampled, which puts an unnecessary burden on the network (e.g., network 106) and the rendering computing device (e.g., 102), or under-sampled, which results in blurry image quality on the 2D display (e.g., 104) outputting the volume rendered 3D data.

To meet this SSE requirement, the voxel grid may be pre-processed (i.e., processed prior to runtime for rendering the 3D data to the 2D display) into an octree data structure where the original tiles are stored in leaf nodes and every block of 2×2×2 tiles is averaged into a parent tile with the same dimensions, and thus a lower level of detail (LOD). This averaging process continues until there is only a single tile left, called the root. Metadata describing this octree data structure may be provided to the rendering computing device (e.g., 102) in advance of runtime, for example by a network device (e.g., server 108) providing the 4D volume data set.

At runtime (i.e., runtime for rendering the 3D data to the 2D display) the SSE of the root may be calculated and if the SSE of the root exceeds the desired SSE (a pre-selected and/or user defined metric stored in a memory available to the rendering computing device), the children tiles of the root tile are loaded, repeating recursively until the SSE is satisfied for all tiles or the desired memory limit is reached. These loaded tiles form a sparse voxel octree (SVO), meaning not all levels of the tree are fully occupied. For example, if the camera is near the corner of a detailed dataset and the camera view direction is looking inward toward the dataset, the system will load higher detail tiles near the corner of the camera view and lower detail tiles in distant areas of the camera view. However, from the camera's perspective all voxels will project to approximately the same size.

As discussed above, at runtime for rendering the 4D volume dataset (i.e., runtime for rendering the 3D data to the 2D display) all of the timestamps are mapped to a timeline which contains a playhead that has some access pattern. Only a subset of keyframes can fit into memory, such as a memory (e.g., 126) of a rendering computing device (e.g., 102), at once, so the camera location, playhead location, and access pattern all influence which keyframes may be requested from the network device (e.g., server 108 via network 106). Generally, keyframes that are closest to the playhead may be requested with higher priority than keyframes that are farther away from the playhead. However, if the playhead is moving forward it's important to prioritize upcoming keyframes so that requests for data for the 4D volume dataset have a chance to resolve in time and don't stall playback. In contrast, if the playhead is moving randomly, it's important to prioritize keyframes in a more distributed manner, including keyframes that are behind the playhead. In this manner, there may always be data available for rendering, even if it's not the highest detail possible.

In various embodiments, the SVO may be extended to support time-dynamic data (i.e., 4D data) by having each node, or spatial node, contain a list of keyframe nodes. All keyframe nodes have the same spatial location and LOD as their corresponding spatial node, but reference data at unique points in time. A spatial node can have as many keyframe nodes as there are keyframes in the dataset, though depending on the total keyframe count and the access pattern it may make sense to limit the number of keyframe nodes that are allocated. For example, with predictable access patterns like forward access only a small number of keyframe nodes are required because they can be recycled as the playhead moves forward. In other words, once a keyframe goes behind the playhead it is reassigned to data that is coming up next. With random access it's useful to keep more, if not all, keyframe nodes in memory (e.g., memory 126) because any one of the keyframe nodes could be called upon for rendering at any time. In various embodiments, the keyframe nodes do not store the actual voxel data of the 4D volume dataset. Rather, the keyframe nodes just point to the actual voxel data of the 4D volume dataset. As such, it may be the case that when a keyframe node is first created, that created keyframe node may be referencing voxel data that has not been loaded yet at the rendering computing device (e.g., 102), such as voxel data not yet received over the network (e.g., not yet received at the computing device 102 from server 108 via the network 106).

Figure 3:
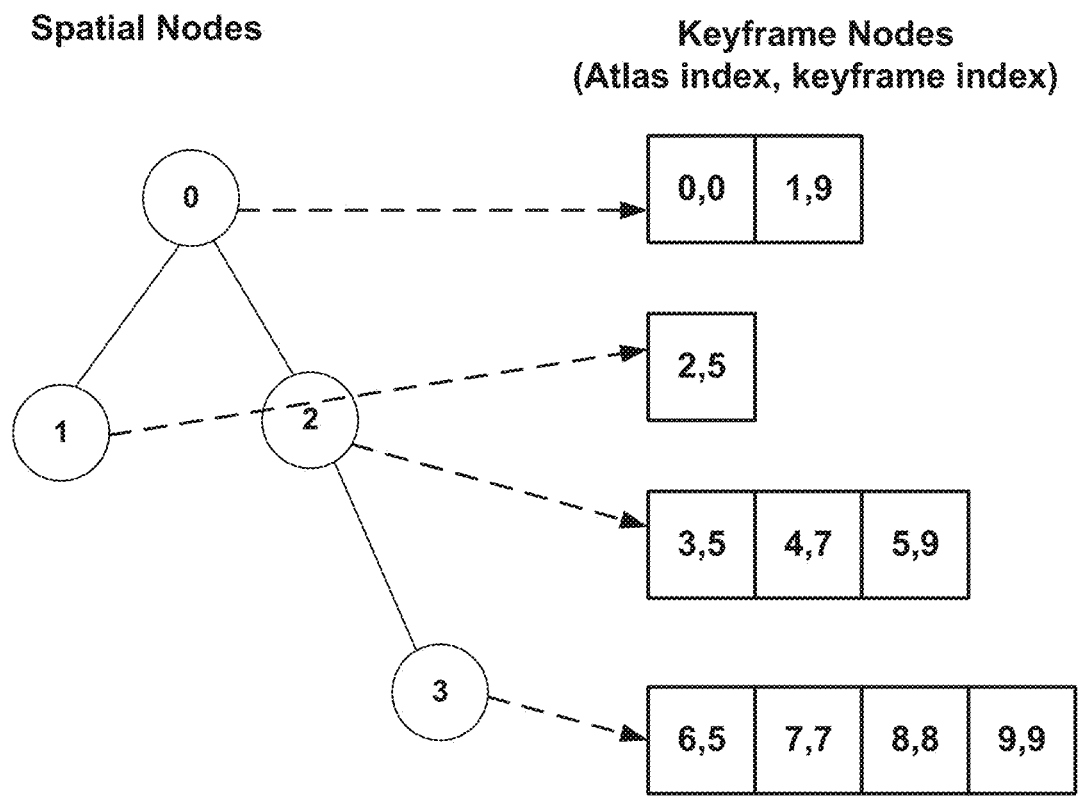
FIG. 3 is an illustrative example of a relationship between spatial nodes and keyframe node lists according to various embodiments.
Figure 4:
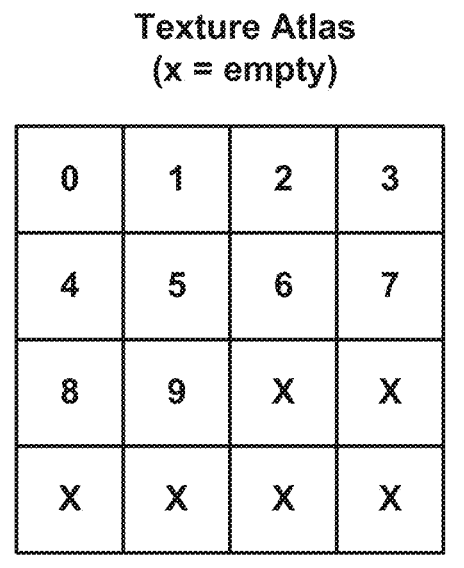

In various embodiments, in order to simplify GPU texture management (e.g., texture management by the GPU 127), each keyframe node that is fully loaded and selected for rendering may be assigned an index into a shared 3D texture atlas where the voxel data for that keyframe node is stored. For example, an atlas with dimensions 256×256×256 may have a capacity for 512 keyframe nodes at 32×32×32 voxels. With reference to FIGS. 1-4, FIG. 3 illustrates an example relationship between spatial nodes and keyframe nodes assigned to spatial nodes with the atlas index and keyframe index indicated for the keyframe nodes while FIG. 4 illustrates an example of the corresponding texture atlas. It should be noted that FIG. 3 uses binary trees instead of octrees for ease of illustration. FIGS. 3 and 4 illustrate example spatial nodes, example keyframe nodes, and an example texture atlas based on the example timeline illustrated in FIG. 1. When a keyframe node is processed a check as to whether there is an over-writeable index in the atlas is made and, if so, the keyframe's data is copied into the corresponding region of texture memory, potentially overwriting stale data that belonged to something that went offscreen or far behind the playhead. When a spatial node is no longer visible, the atlas indices occupied by its keyframe nodes are made over-writeable, allowing some other spatial node's keyframe nodes to take its place. But if the spatial node becomes visible again before all of its keyframe nodes' spots have been occupied by other spatial nodes' keyframe nodes, those keyframe nodes that were not occupied by other keyframe nodes will reoccupy their original indices without having to have data re-requested as the data remained in the atlas. To maximize the probability of re-occupancy, indices that have been over-writeable for the longest time (i.e., most stale) are overwritten first. The atlas may use two doubly-linked lists to implement this behavior; for example, one for occupied indices and the other for over-writeable indices. When a keyframe node is added to the atlas, a check is made as to whether or not the over-writeable list is non-empty and, if non-empty, the front node of the over-writeable list is moved to the back of the occupied list. When a keyframe node is removed, the indication of the front node of the occupied list is moved to the back of the over-writeable list.

As the atlas has space for a fixed number of keyframe nodes, it may be beneficial to request an appropriate number of keyframe nodes to fill that space. If too few keyframe nodes are requested, the atlas will be underutilized, storing empty space that should be going towards rendering. If too many keyframe nodes are requested, the atlas will not have enough space and will be forced to discard some of the loaded keyframe nodes, putting an unnecessary burden on the network (e.g., by requesting keyframe node data that was not ever usable). In various embodiments, a fixed-capacity min-max heap may be used to select the most relevant keyframe nodes for rendering. This structure allows for inserting or removing either the minimum or maximum priority element in a group in O(log(N)) time. In various embodiments, the min-max heap data structure may have the same storage capacity as the atlas and may be repopulated at the start of every frame.

In various embodiments, starting with the root spatial node, a priority may be assigned to each of the root spatial node's keyframe nodes based on a combination of the spatial node's SSE, the keyframe node's location relative to the playhead, and the playhead access pattern. Each keyframe node is inserted into the min-max heap data structure, which, if full, kicks out the lowest priority keyframe node. This process may continue recursively for the root node's children as long as the SSE is met, with the end result being a min-max heap of the highest priority keyframe nodes that are suitable for rendering. The min-max heap may be sorted and processed from highest to lowest priority and network requests are made for keyframe nodes that don't have data in the atlas yet (for example, the rendering computing device 102 may request keyframe nodes from the server 108 via the network 106). If too many keyframe nodes would result in too many network requests being made at the same time, lower priority keyframe nodes may be throttled and tried again later. By the time a keyframe node's data is retrieved from the network, there's a possibility that it's no longer prioritized because the camera or playhead moved, in which case the data is discarded and the atlas index is left untouched.

In various embodiments, prior to rendering, as each spatial node is processed, two keyframe nodes may be found for each spatial node to interpolate between for rendering that spatial node. Ideally, the two keyframe nodes may be the ones immediately before and after the playhead. However, due to delays and unpredictability of requesting data over a network or filesystem (e.g., network 106 delays or losses resulting in requested data not being available at the rendering computing device 102), the best possible choices aren't always available. As such, the requirements can be relaxed to have one keyframe node come from the current spatial node's own list of keyframe nodes and the other selected keyframe node to come from one of the current spatial node's ancestors. This ability to select keyframe nodes from a spatial node's ancestor nodes allows for different rendering strategies that favor either visual quality, temporal quality, or some combination of the two.

Visual quality favors tiles that are high detail no matter how far away the tiles are from the playhead, resulting in detailed but less responsive rendering. In contrast, temporal quality favors rendering tiles that are closest in time to the playhead, even if those tiles aren't the highest detail. For example, if the playhead is at 5.5 sec and there are high detail keyframes at 5.0 sec and 7.0 sec and a lower detail keyframe at 6.0 sec, the rendering computing device (e.g., 102) may interpolate between the high detail keyframe at 5.0 sec and the lower detail keyframe at 6.0 sec. In various embodiments, a hybrid prioritization system aims for a perceptually optimal balance of visual quality and temporally quality by prioritizing tiles by their temporal and visual closeness and searching upwards in the SVO for more optimal candidates. The higher the search goes upwards in the SVO, the lower the visual quality but potentially the higher the temporal quality. Balancing the priorities so that the search rarely exceeds three levels of detail may result in both responsive and high quality rendering.

In various embodiments, a hybrid prioritization system may include both pre-load prioritization operations and pre-render prioritization operations.

In various embodiments, pre-load prioritization may include requesting one or more keyframe nodes associated with one or more spatial nodes in a sparse voxel octree of a 4D volume dataset based at least in part on a keyframe node prioritization. In various embodiments, the keyframe node prioritization may be based at least in part on a SSE priority value, a temporal priority value, and a random selection priority value. In some embodiments, the SSE priority value may be based at least in part on a SSE of that keyframe node's associated spatial node. In some embodiments, the temporal priority value may be based at least in part on that keyframe node's location in a timeline relative to the playhead location in the timeline. In some embodiments, the random selection priority value may be based at least in part on a stored random selection priority distribution.

In various embodiments, pre-load prioritization may include determining a SSE priority value as the spatial node's SSE normalized to a value between zero and one (e.g., [0,1]). For example, the SSE priority value may be determined by dividing the SSE of that keyframe node's associated spatial node by the sum of one plus the SSE of that keyframe node's associated spatial node (e.g., ssePriority=SSE/(1+SSE)). This may prioritize spatial nodes that have optimal level of detail from the camera's perspective.

In various embodiments, pre-load prioritization may include determining a temporal priority value as a function of the keyframe node's distance to the playhead location. In various embodiments, the temporal priority value may be determined based at least in part on that keyframe node's location in a timeline relative to the playhead location in the timeline. As an example, the temporal priority value may be determined as difference of one minus the result of dividing the keyframe distance by the maximum keyframe distance raised to the power of four (e.g., temporalPriority=pow ((1.0−key-FrameDistance/maxKey-FrameDistance), 4.0). This prioritizes keyframe nodes that are closer to the playhead, which may be beneficial for responsive rendering when the user inspects something that changes over a small window of time.

Figure 5:
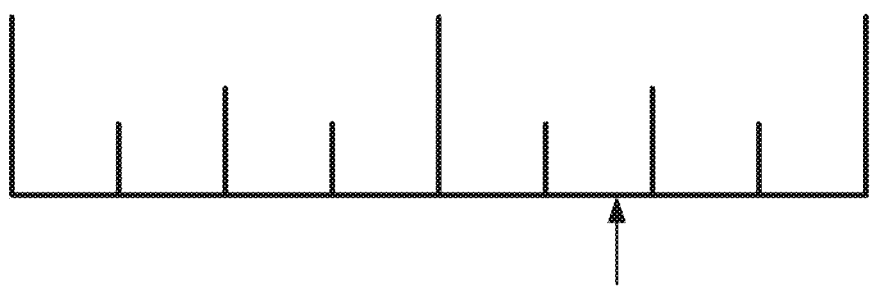
FIG. 5 is an illustrative example showing a comparison of a random selection priority scheme and a temporal priority scheme according to various embodiments.
Figure 5:
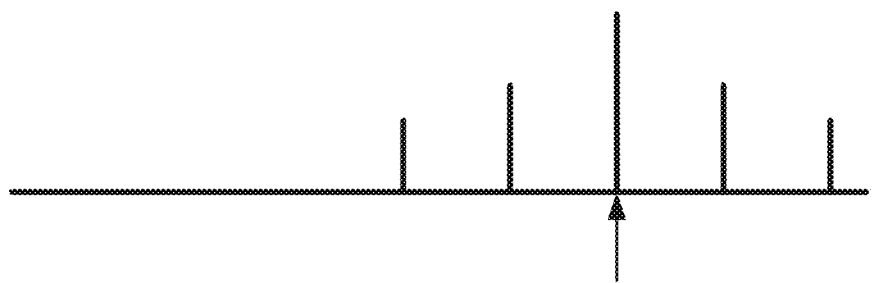

With reference to FIGS. 1-5, in FIG. 5 random selection priority is compared to temporal priority. In various embodiments, random selection priority assigns priorities to keyframes in a manner similar to the markings on a ruler, where locations that are multiples of larger units are drawn thicker. In various embodiments, this random selection priority distribution may be stored in a table that is calculated up front based on the number of keyframes in the 4D volume dataset and may be indexed by keyframe ID. In various embodiments, the algorithm to generate the random selection priority distribution may start by setting the priority of the first, middle, and last keyframes to 1.0. Then both of these intervals are split in half, assigning half the priority (0.5) to the keyframe in the middle of the intervals, repeating recursively until the keyframes can't be subdivided any further. For example, a dataset with 9 keyframes may result in the random selection priority (e.g., randomSelectionPriority) distribution of randomSelectionPriority=[1.0, 0.25, 0.5, 0.25, 1.0, 0.25, 0.5, 0.25, 1.0]. This random selection priority distribution may be a priority distribution that responds well to sudden random movements of the playhead because it minimizes the distance to a higher priority keyframe without triggering too many keyframe loads.

In various embodiments, the keyframe node prioritization may be based at least in part on the SSE priority value (e.g., ssePriority), the temporal priority value (e.g., temporalPriority), and/or the random selection priority distribution (e.g., randomSelectionPriority). For the example, the SSE priority value (e.g., ssePriority), the temporal priority value (e.g., temporalPriority), and the random selection priority distribution (e.g., randomSelectionPriority) may be combined into a final priority that is the keyframe node prioritization by multiplying ten times the SSE priority value (e.g., ssePriority) and adding the result of linear interpolation between the random selection priority distribution (e.g., randomSelectionPriority) and the temporal priority value (e.g., temporalPriority) at an increment corresponding to the result of linear interpolation between the value 0.15 and the value 1.0 at the increment that is the temporal priority value (e.g., temporalPriority) (e.g., keyframe node prioritization=10.0*ssePriority+lerp(randomSelectionPriority, temporalPriority, lerp(0.15, 1.0, temporalPriority))). This combination was found to responded well to both small movements and sudden large movements while maintaining high visual fidelity. All three constituent priorities may be normalized to value between zero and one to simplify any adjustments to the final function. The combination of priorities can be adjusted depending on the expected playhead movement pattern.

In various embodiments, pre-render prioritization may include populating an array encoded sparse voxel octree of spatial nodes to be rendered with two keyframe nodes per spatial node to be rendered from the 3D texture atlas. In various embodiments, for a given spatial node, the nearest keyframe nodes on both sides of the playhead may be determined and their distances to the playhead may be determined. The smaller the distance, the better the keyframe node may be to select. This determination of nearest keyframe nodes may be repeated recursively as long as the ancestor node results in better results (e.g., a closer keyframe node distance to the playhead). Ancestor nodes may have a handicap, such as a handicap defined as the exponential function result of four times the ancestor level (e.g., Math.exp(ancestorLevel*4.0)) multiplied by their keyframe node distances (e.g., keyframe node distance*Math.exp(ancestorLevel*4.0)) in order to strike a balance between visual and temporal quality.

In various embodiments, if either side of the playhead doesn't have a keyframe node, the rendering computing device (e.g., 102) may not attempt to interpolate something at the playhead location. As such, this outcome may be highly deprioritized by multiplying the keyframe node distances by a large value, such as 200. This makes it very likely to select an ancestor keyframe node instead.

In some embodiments, if the two best keyframe node candidates come from ancestor nodes, the current spatial node may be ignored and not sent to the GPU for rendering.

Figure 6:
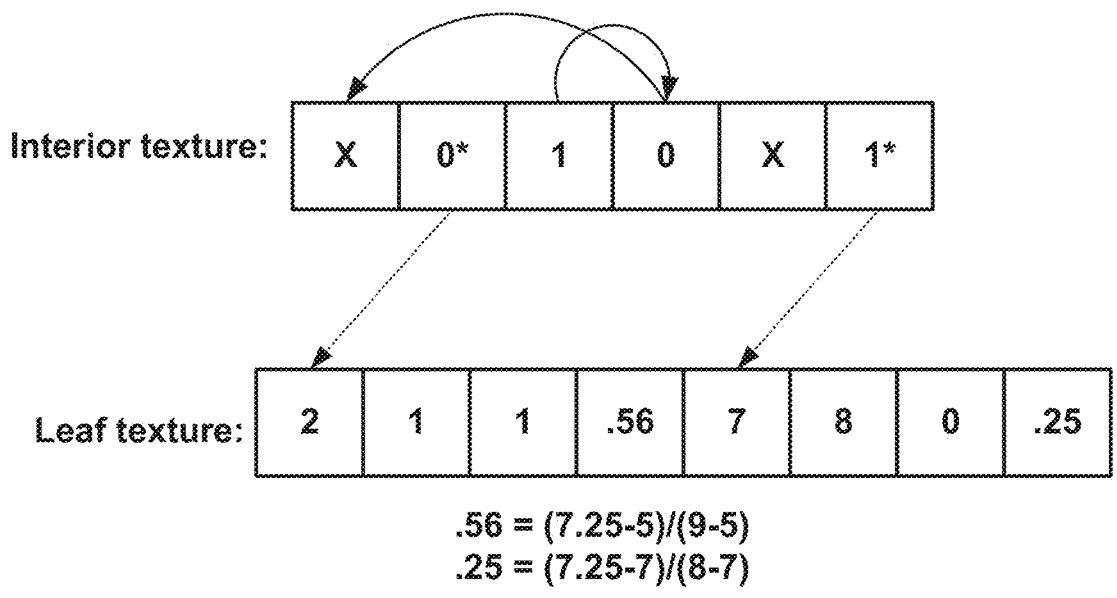
FIG. 6 is an illustrative example of a graphics processing unit (GPU) array encoded sparse voxel octree according to various embodiments.

In various embodiments, at the completion of the hybrid prioritization, for example at the completion of the pre-load prioritization operations and/or the pre-render prioritization operations, all spatial nodes may have two loaded keyframe nodes selected for rendering. In some embodiments, one of the two loaded keyframe nodes selected for rendering may be from an ancestor spatial node. The final tree may be sent to the GPU as an array-encoded SVO where each interior node has an index to its parent node followed by indices to its eight children. This array-encoded SVO where each interior node has an index to its parent node followed by indices to its eight children may improve traversal speeds from an existing offset in the tree. If some of the children aren't loaded, a sentinel value may be used in their place to indicate the tree doesn't go deeper in that direction. A different sentinel value may be used to indicate that a child is a leaf node. Leaf nodes may point to a separate array which stores the atlas index of the first keyframe node, the atlas index of the second keyframe node, the LOD difference between the second keyframe node and the current spatial node, and the interpolation factor between the two nodes. Only the second atlas index needs to record its LOD difference because if both keyframes nodes were at different LODs than the spatial node, the spatial node would be made redundant by one of its ancestors, and so there would be no need to include it in the final tree. With reference to FIGS. 1-6, FIG. 6 illustrates aspects of such an embodiment GPU array encoded sparse voxel octree. The example sparse voxel octree illustrated in FIG. 6 is an example based on the example spatial nodes, example keyframe nodes, and an example texture atlas of FIGS. 3 and 4 and the example timeline illustrated in FIG. 1.

At render time, the value at a particular point in space is retrieved by traversing the octree from top to bottom. First a check as to whether the point is inside the space covered by the root tile may be made. If so, a check as to which of the eight children the point is inside may be made. This process repeats until a leaf tile is reached. The leaf tile's first texture atlas index may be retrieved, and in combination with the local coordinate of the point within the leaf tile, mapped to a location in the atlas. If the second atlas index has an LOD difference greater than zero, the coordinate must be transformed to the local coordinates of the ancestor LOD. An example equation for this transformation may be: Fract((spatialNodeLocation.xyz+localCoords.xyz)*LOD_difference). Finally, the two samples are interpolated using the leaf node's interpolation factor.

Various embodiments may provide a method for responsive and high quality rendering of time-dynamic (4D) hierarchical level-of-detail voxel datasets. Various embodiments may provide a prioritization system that balances visual quality and temporal responsiveness even with slow network or filesystem speeds (e.g., slow network 106 or server 108 speeds). Various embodiments may provide a compact and efficient storage format for time-dynamic and mixed-resolution voxel rendering on a GPU (e.g., GPU 127).

Figure 7:
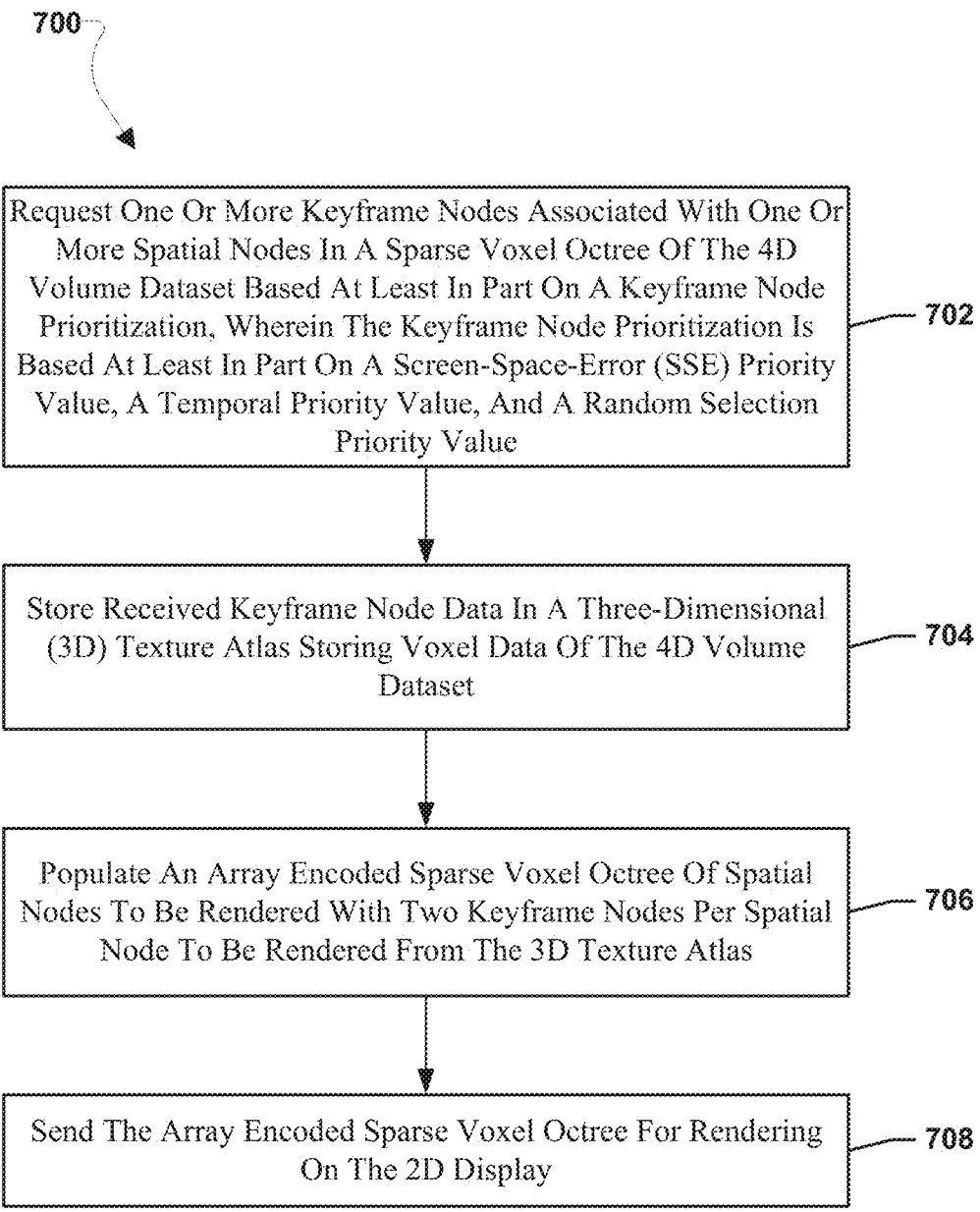
FIG. 7 is a process flow diagram illustrating a method for rendering at least a portion of a time-dynamic (4D) volume dataset on a two-dimensional (2D) display according to various embodiments.

FIG. 7 is a process flow diagram illustrating a method 700 for rendering at least a portion of a time-dynamic (4D) volume dataset on a two-dimensional (2D) display according to various embodiments. With reference to FIGS. 1-7, in various embodiments, the operations of method 700 may be performed by a processor of a computing device (e.g., application processor 125, GPU 127, etc.) to render a 4D volume dataset on a display (e.g., display 104).

In block 702, the processor may perform operations to request one or more keyframe nodes associated with one or more spatial nodes in a sparse voxel octree of the 4D volume dataset based at least in part on a keyframe node prioritization, wherein the keyframe node prioritization is based at least in part on a screen-space-error (SSE) priority value, a temporal priority value, and a random selection priority value. In various embodiments, for each keyframe node, the SSE priority value may be based at least in part on a screen-space-error of that keyframe node's associated spatial node, and the temporal priority value may be based at least in part on that keyframe node's location in a timeline relative to the playhead location in the timeline. In various embodiments, the random selection priority value is based at least in part on a stored random selection priority distribution. In various embodiments, the SVO may be extended to support time-dynamic data (i.e., 4D data) by having each node, or spatial node, contain a list of keyframe nodes. All keyframe nodes have the same spatial location and LOD as their corresponding spatial node, but reference data at unique points in time. A spatial node can have as many keyframe nodes as there are keyframes in the dataset.

In block 704, the processor may perform operations to store received keyframe node data in a three-dimensional (3D) texture atlas storing voxel data of the 4D volume dataset. For example, the received keyframe node data may be stored in a 3D texture atlas in a memory (e.g., memory 126) available to the computing device (e.g., 102). In some embodiments, storing the received keyframe node data in a three-dimensional (3D) texture atlas storing voxel data of the 4D volume dataset may include receiving keyframe node data in response to a sent network request, determining whether the keyframe node data is no longer prioritized in response to receiving the keyframe node data, discarding the keyframe node data in response to determining the keyframe node data is no longer prioritized, and storing the keyframe node data in the 3D texture atlas in response to determining the keyframe node data is not no longer prioritized. In various embodiments, in order to simplify GPU texture management (e.g., texture management by the GPU 127), each keyframe node that is fully loaded and selected for rendering may be assigned an index into a shared 3D texture atlas where the voxel data for that keyframe node is stored.

In block 706, the processor may perform operations to populate an array encoded sparse voxel octree of spatial nodes to be rendered with two keyframe nodes per spatial node to be rendered from the 3D texture atlas. In various embodiments, prior to rendering, as each spatial node is processed, two keyframe nodes may be found for each spatial node to interpolate between for rendering that spatial node. Ideally, the two keyframe nodes may be the ones immediately before and after the playhead. However, due to delays and unpredictability of requesting data over a network or filesystem (e.g., network 106 delays or losses resulting in requested data not being available at the rendering computing device 102), the best possible choices aren't always available. As such, the requirements can be relaxed to have one keyframe node come from the current spatial node's own list of keyframe nodes and the other selected keyframe node to come from one of the current spatial node's ancestors. This ability to select keyframe nodes from a spatial node's ancestor nodes allows for different rendering strategies that favor either visual quality, temporal quality, or some combination of the two.

In block 708, the processor may perform operations to send the array encoded sparse voxel octree for rendering on the 2D display. In various embodiments, sending the array encoded sparse voxel octree for rendering on the 2D display may include sending the array encoded sparse voxel octree to a GPU for rendering on the 2D display. In various embodiments, at the completion of the hybrid prioritization, for example at the completion of the pre-load prioritization operations and/or the pre-render prioritization operations, all spatial nodes may have two loaded keyframe nodes selected for rendering. At render time, the value at a particular point in space is retrieved by traversing the octree from top to bottom. First a check as to whether the point is inside the space covered by the root tile may be made. If so, a check as to which of the eight children the point is inside may be made. This process repeats until a leaf tile is reached. The leaf tile's first texture atlas index may be retrieved, and in combination with the local coordinate of the point within the leaf tile, mapped to a location in the atlas. If the second atlas index has an LOD difference greater than zero, the coordinate must be transformed to the local coordinates of the ancestor LOD.

Figure 8:
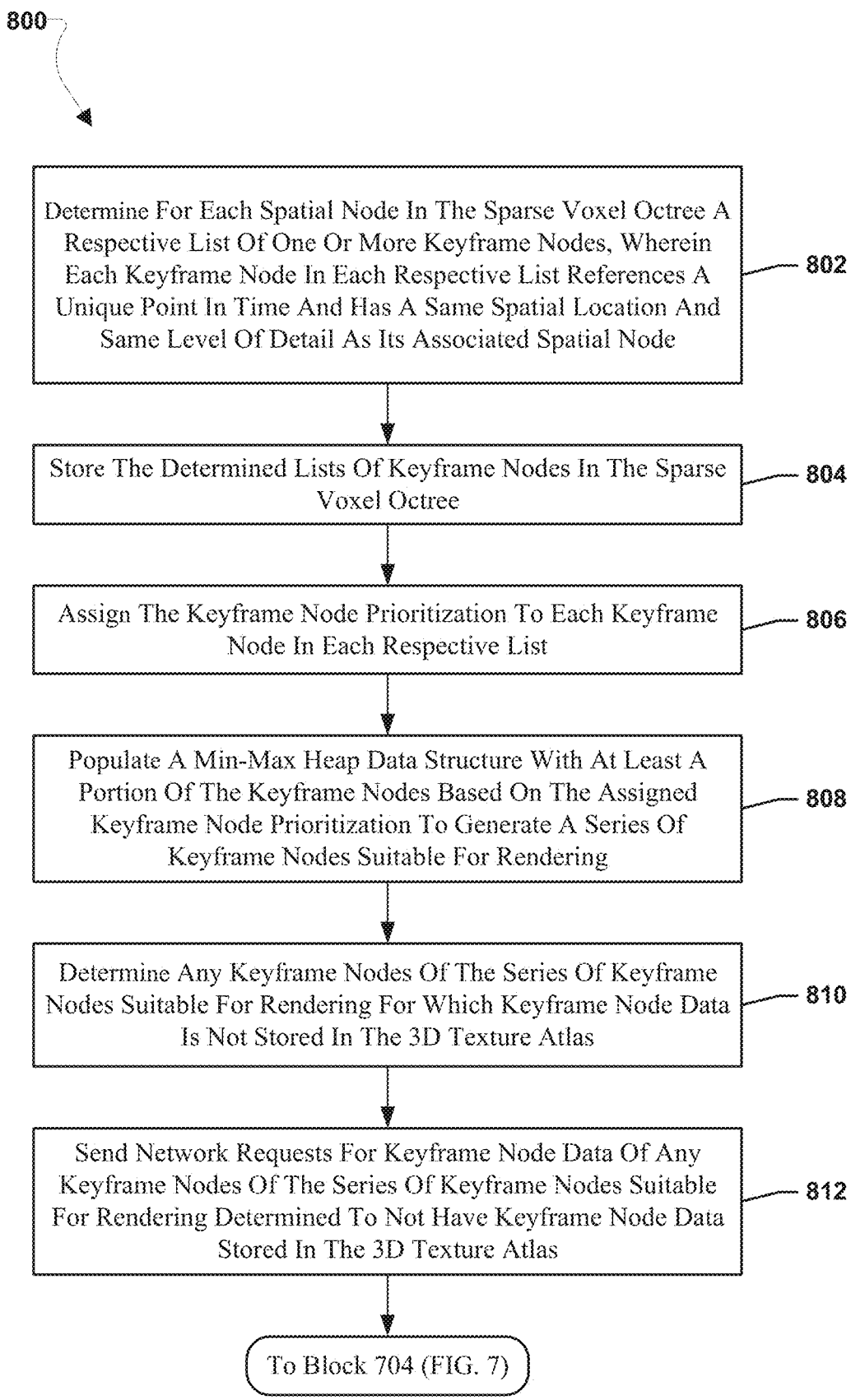
FIG. 8 is a process flow diagram illustrating a method for requesting one or more keyframe nodes associated with one or more spatial nodes in a sparse voxel octree of a 4D volume dataset based at least in part on a keyframe node prioritization according to various embodiments.

FIG. 8 is a process flow diagram illustrating a method 800 for requesting one or more keyframe nodes associated with one or more spatial nodes in a sparse voxel octree of a 4D volume dataset based at least in part on a keyframe node prioritization according to various embodiments. With reference to FIGS. 1-8, in various embodiments, the operations of method 800 may be performed by a processor of a computing device (e.g., application processor 125, GPU 127, etc.). In various embodiments, the operations of method 800 may be performed in conjunction with the operations of method 700 (FIG. 7). As a specific example, the operations of method 800 may be performed as part of the operations of block 702 to request the one or more keyframe nodes associated with the one or more spatial nodes in the sparse voxel octree of the 4D volume dataset based at least in part on the keyframe node prioritization.

In block 802, the processor may perform operations to determine for each spatial node in the sparse voxel octree a respective list of one or more keyframe nodes, wherein each keyframe node in each respective list references a unique point in time and has a same spatial location and same level of detail as its associated spatial node.

In block 804, the processor may perform operations to store the determined lists of keyframe nodes in the sparse voxel octree.

In block 806, the processor may perform operations to assign the keyframe node prioritization to each keyframe node in each respective list. In various embodiments, starting with the root node, a priority may be assigned to each of the root frame's keyframe nodes based on a combination of the spatial node's SSE (i.e., the SSE of the root node), the keyframe node's location relative to the playhead, and the playhead access pattern.

In block 808, the processor may perform operations to populate a min-max heap data structure with at least a portion of the keyframe nodes based on the assigned keyframe node prioritization to generate a series of keyframe nodes suitable for rendering. In various embodiments, a fixed-capacity min-max heap may be used to select the most relevant keyframe nodes for rendering. This structure allows for inserting or removing either the minimum or maximum priority element in a group in O(log(N)) time. In various embodiments, the min-max heap data structure may have the same storage capacity as the atlas and may be repopulated at the start of every frame. Each keyframe node is inserted into the min-max heap data structure, which, if full, kicks out the lowest priority keyframe node. This process may continue recursively for the root node's children as long as the SSE is met, with the end result being a min-max heap of the highest priority keyframe nodes that are suitable for rendering.

In block 810, the processor may perform operations to determine any keyframe nodes of the series of keyframe nodes suitable for rendering for which keyframe node data is not stored in the 3D texture atlas.

In block 812, the processor may perform operations to send network requests for keyframe node data of any keyframe nodes of the series of keyframe nodes suitable for rendering determined to not have keyframe node data stored in the 3D texture atlas. In various embodiments, sending network requests for keyframe node data of any keyframe nodes of the series of keyframe nodes suitable for rendering determined to not have keyframe node data stored in the 3D texture atlas may include sending network requests for keyframe node data of any keyframe nodes of the series of keyframe nodes suitable for rendering determined to not have keyframe node data stored in the 3D texture atlas sequentially in priority order. The min-max heap may be sorted and processed from highest to lowest priority and network requests are made for keyframe nodes that don't have data in the atlas yet (for example, the rendering computing device 102 may request keyframe nodes from the server 108 via the network 106).

Figure 9A:
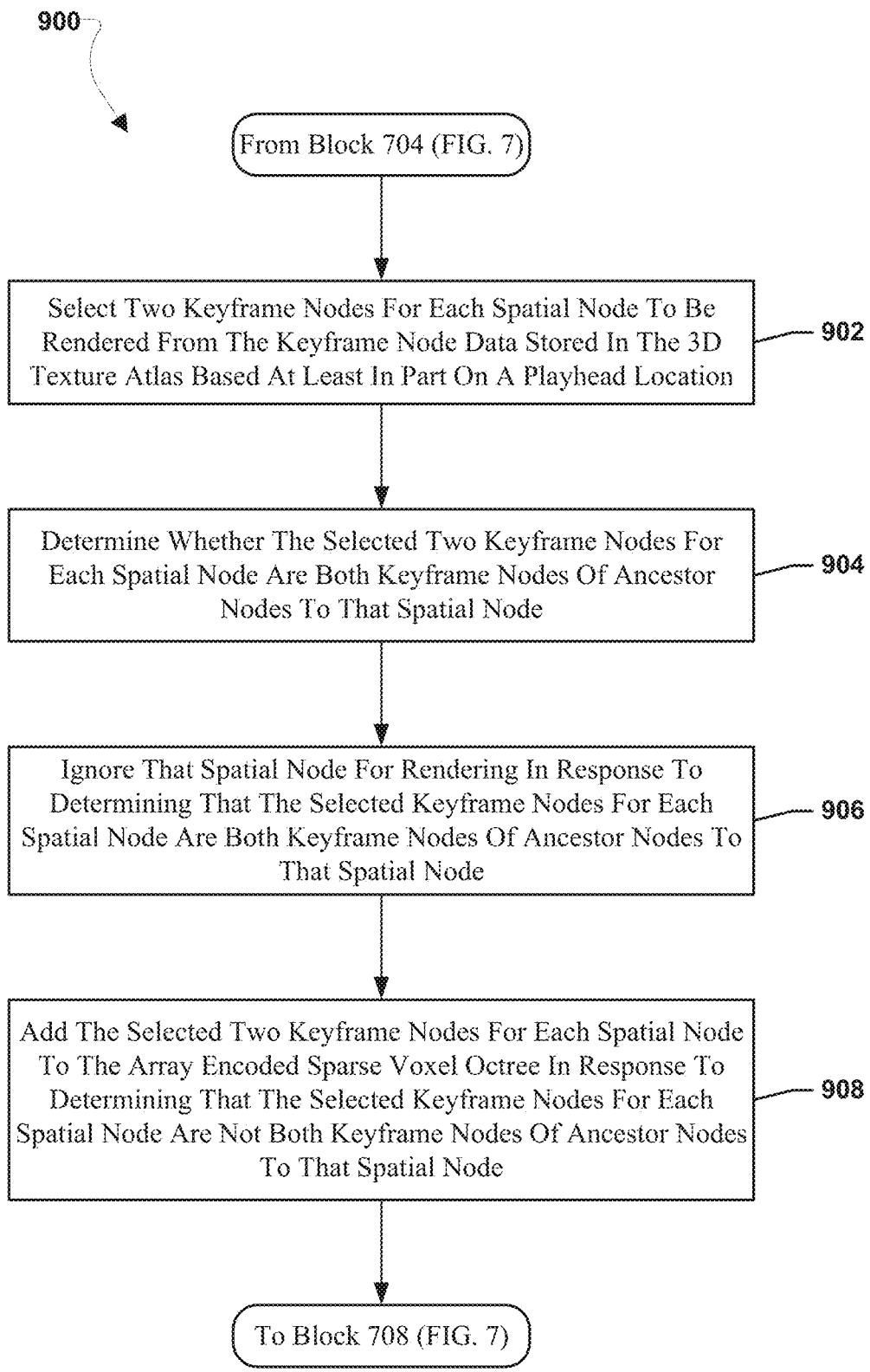
FIG. 9A is a process flow diagram illustrating a method for populating an array encoded sparse voxel octree of spatial nodes to be rendered with two keyframe nodes per spatial node to be rendered from a 3D texture atlas according to various embodiments.

FIG. 9A is a process flow diagram illustrating a method 900 for populating an array encoded sparse voxel octree of spatial nodes to be rendered with two keyframe nodes per spatial node to be rendered from a 3D texture atlas according to various embodiments. With reference to FIGS. 1-9A, in various embodiments, the operations of method 900 may be performed by a processor of a computing device (e.g., application processor 125, GPU 127, etc.). In various embodiments, the operations of method 900 may be performed in conjunction with the operations of method 700 (FIG. 7) and/or 800 (FIG. 8). As a specific example, the operations of method 900 may be performed as part of the operations of block 706 to populate the array encoded sparse voxel octree of spatial nodes to be rendered with two keyframe nodes per spatial node to be rendered from the 3D texture atlas.

In block 902, the processor may perform operations to select two keyframe nodes for each spatial node to be rendered from the keyframe node data stored in the 3D texture atlas based at least in part on a playhead location. In various embodiments, pre-render prioritization may include populating an array encoded sparse voxel octree of spatial nodes to be rendered with two keyframe nodes per spatial node to be rendered from the 3D texture atlas. In various embodiments, for a given spatial node, the nearest keyframe nodes on both sides of the playhead may be determined and their distances to the playhead may be determined. The smaller the distance, the better the keyframe node may be to select. In some embodiments, one of the two loaded keyframe nodes selected for rendering may be from an ancestor spatial node. For example, one keyframe node may come from the current spatial node's own list of keyframe nodes and the other selected keyframe node may come from one of the current spatial node's ancestors. This ability to select keyframe nodes from a spatial node's ancestor nodes allows for different rendering strategies that favor either visual quality, temporal quality, or some combination of the two. This determination of nearest keyframe nodes may be repeated recursively as long as the ancestor node results in better results (e.g., a closer keyframe node distance to the playhead).

In block 904, the processor may perform operations to determine whether the selected two keyframe nodes for each spatial node are both keyframe nodes of ancestor nodes to that spatial node. In some embodiments, if the two best keyframe node candidates come from ancestor nodes, the current spatial node may be ignored and not sent to the GPU for rendering.

In block 906, the processor may perform operations to ignore that spatial node for rendering in response to determining that the selected keyframe nodes for each spatial node are both keyframe nodes of ancestor nodes to that spatial node.

In block 908, the processor may perform operations to add the selected two keyframe nodes for each spatial node to the array encoded sparse voxel octree in response to determining that the selected keyframe nodes for each spatial node are not both keyframe nodes of ancestor nodes to that spatial node.

Figure 9B:
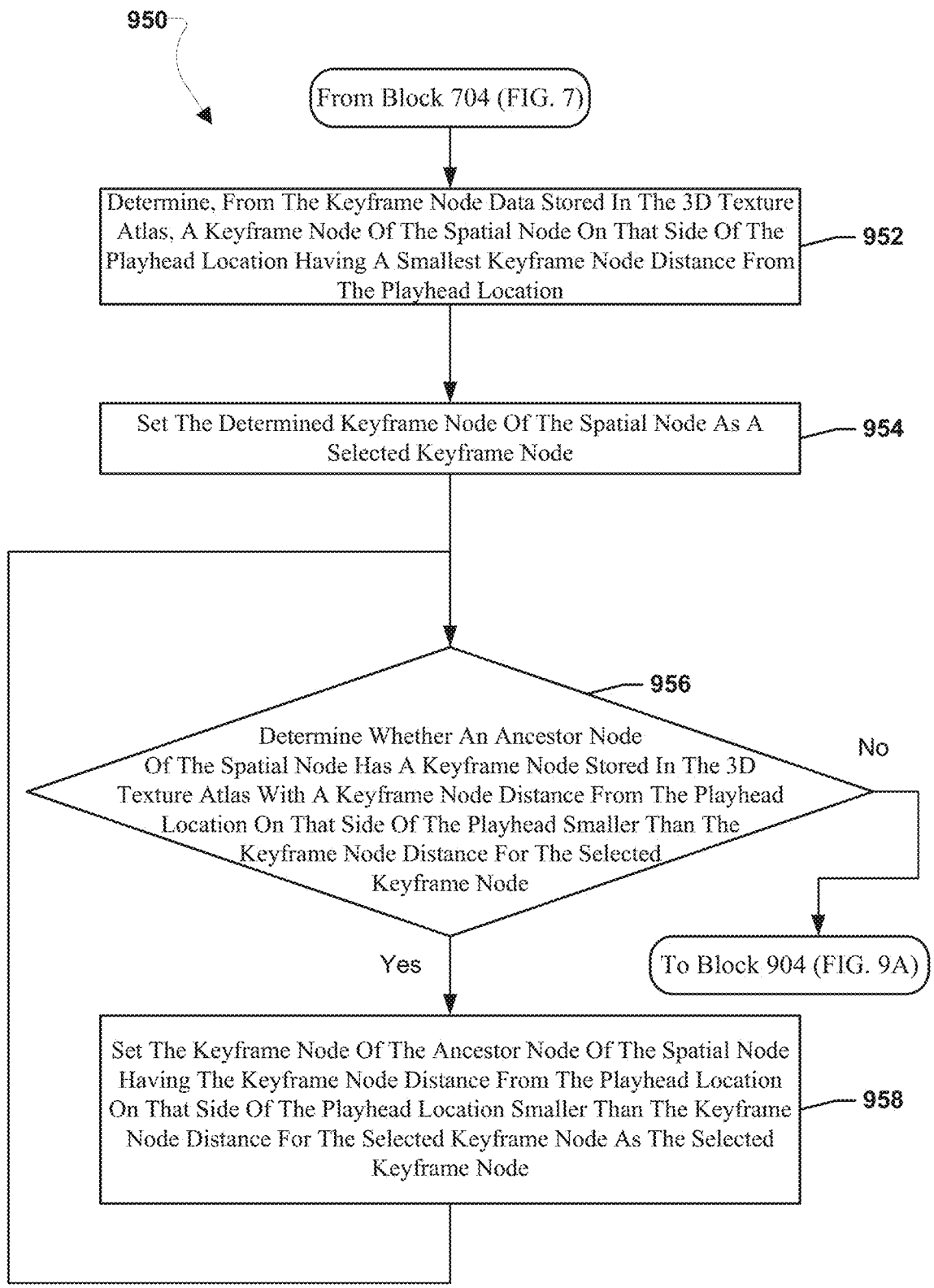
FIG. 9B is a process flow diagram illustrating a method for selecting the two keyframe nodes to be rendered according to various embodiments.

FIG. 9B is a process flow diagram illustrating a method 950 for selecting the two keyframe nodes to be rendered according to various embodiments. With reference to FIGS. 1-9B, in various embodiments, the operations of method 950 may be performed by a processor of a computing device (e.g., application processor 125, GPU 127, etc.). In various embodiments, the operations of method 950 may be performed for each spatial node and may be performed on each respective side of the playhead location (i.e., performed for selecting a keyframe node ahead of the playhead location in the timeline and also performed for selecting a keyframe node behind the playhead location in the timeline). In various embodiments, the operations of method 950 may be performed in conjunction with the operations of method 700 (FIG. 7), 800 (FIG. 8), and/or 900 (FIG. 9A). As a specific example, the operations of method 950 may be performed as part of the operations of block 902 to select two keyframe nodes for each spatial node to be rendered from the keyframe node data stored in the 3D texture atlas based at least in part on a playhead location. Specifically in such an example, the operations of method 950 may be performed in two separate instances for each spatial node, one instance to select a keyframe node ahead of the playhead location in the timeline and another instance for selecting a keyframe node behind the playhead location in the timeline, thereby resulting in two keyframe nodes for each spatial node to be rendered from the keyframe node data stored in the 3D texture atlas being selected.

In block 952, the processor may perform operations to determine, from the keyframe node data stored in the 3D texture atlas, a keyframe node of the spatial node on that side of the playhead location having a smallest keyframe node distance from the playhead location.

In block 954, the processor may perform operations to set the determined keyframe node of the spatial node as a selected keyframe node.

In determination block 956, the processor may perform operations to determine whether an ancestor node of the spatial node has a keyframe node stored in the 3D texture atlas with a keyframe node distance from the playhead location on that side of the playhead smaller than the keyframe node distance for the selected keyframe node. In various embodiments, the keyframe node distance of the ancestor node of the spatial node may be biased to be longer than its actual keyframe node distance. For example, ancestor nodes may have a handicap, such as a handicap defined as the exponential function result of four times the ancestor level (e.g., Math.exp(ancestorLevel*4.0)) multiplied by their keyframe node distances (e.g., keyframe node distance*Math.exp(ancestorLevel*4.0)). This biasing of the ancestor node keyframe node distances may strike a balance between visual and temporal quality.

In response to the ancestor node of the spatial node having a keyframe node stored in the 3D texture atlas having a keyframe node distance from the playhead location on that side of the playhead location smaller than the keyframe node distance for the selected keyframe node (i.e., determination block 956="Yes"), the processor may perform operations to setting the keyframe node of the ancestor node of the spatial node having the keyframe node distance from the playhead location on that side of the playhead location smaller than the keyframe node distance for the selected keyframe node as the selected keyframe node in block 958.

In response to replacing the selected keyframe node with a new selected keyframe node of the ancestor, the method 950 may return to determination block 956 and the processor may again perform operations to determine whether the next level ancestor node of the spatial node has a keyframe node stored in the 3D texture atlas with a keyframe node distance from the playhead location on that side of the playhead smaller than the keyframe node distance for the newly selected keyframe node. Similarly, in response to that ancestor node having a keyframe node stored in the 3D texture atlas having a keyframe node distance from the playhead location on that side of the playhead location smaller than the keyframe node distance for the newly selected keyframe node (i.e., determination block 956="Yes"), the processor may perform operations to again replace the selected keyframe node. In this manner, the determination of nearest keyframe nodes and replacement with closer ancestor keyframe nodes (i.e., the operations of blocks 956 and 958) may be repeated recursively as long as the ancestor node results in better results (e.g., a closer keyframe node distance to the playhead).

In response to the ancestor node of the spatial node not having a keyframe node stored in the 3D texture atlas having a keyframe node distance from the playhead location on that side of the playhead location smaller than the keyframe node distance for the selected keyframe node (i.e., determination block 956="No"), the processor may perform operations such that the current selected keyframe node may remain one of the two selected keyframe nodes for the current spatial node and the spatial node and the processor may perform further operations as discussed above with reference to block 904 of FIG. 9A. As the operations of method 950 may be performed in two separate instances for each spatial node, one instance to select a keyframe node ahead of the playhead location in the timeline and another instance for selecting a keyframe node behind the playhead location in the timeline, the operations of method 950 may result in two keyframe nodes for each spatial node to be rendered from the keyframe node data stored in the 3D texture atlas being selected and the processor may perform further operations as discussed above with reference to block 904 of FIG. 9A using the two keyframe nodes resulting from the operations of method 950.

Figure 10:
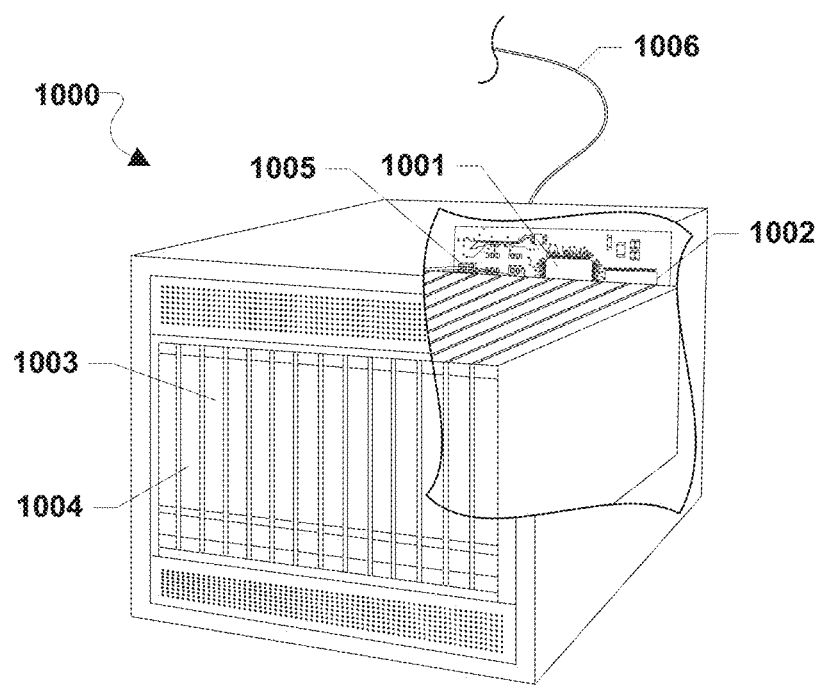
FIG. 10 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1005 coupled to the processor 1001 for establishing data connections with a network 1006, such as a local area network coupled to other broadcast system computers and servers. The processor 1001 may be any programmable microprocessor, microcomputer or multiple processor chip or chips that may be configured by software instructions (applications) to perform a variety of functions, including the functions of the various embodiments described above. Typically, software applications may be stored in the internal memory 1002, 1003 before they are accessed and loaded into the processor 1001. The processor 1001 may include internal memory sufficient to store the application software instructions.

Figure 11:
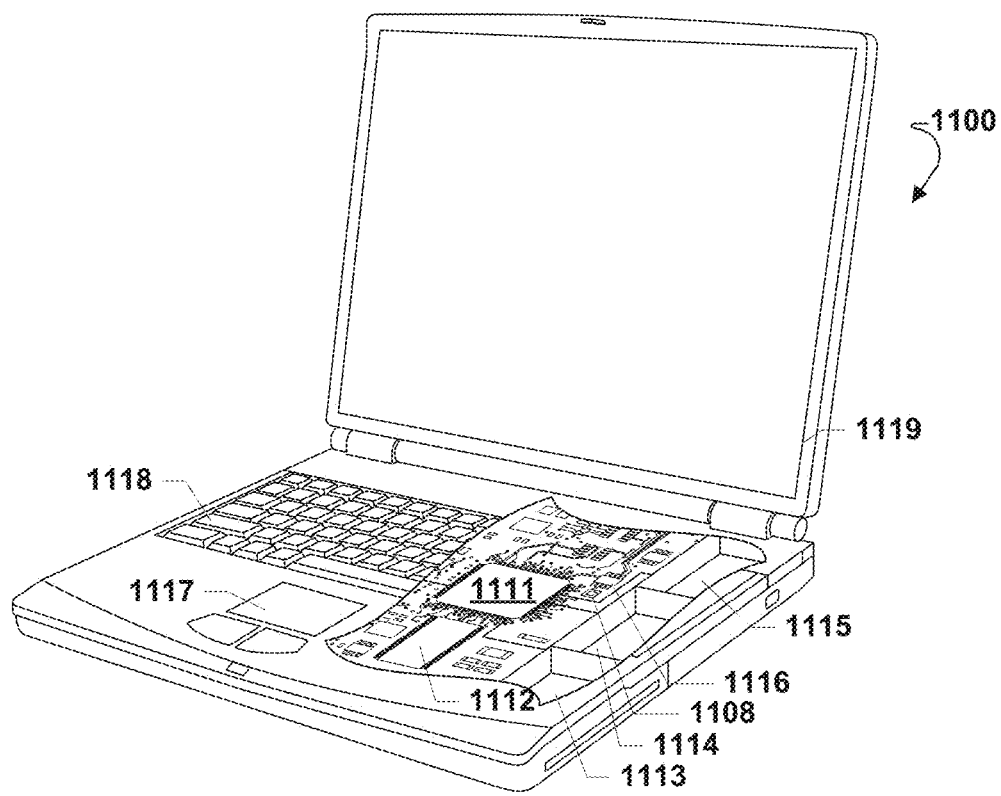
FIG. 11 is a component block diagram of a laptop that is a computing device suitable for use in the various embodiments.

The various embodiments described above may also be implemented within a variety of computing devices, such as a laptop computer 1100 illustrated in FIG. 11. Many laptop computers include a touchpad touch surface 1117 that serves as the computer's pointing device, and thus may receive drag, scroll, and flick gestures similar to those implemented on mobile computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antennas 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for rendering at least a portion of a time-dynamic (4D) volume dataset on a two-dimensional (2D) display, comprising:
   requesting one or more keyframe nodes associated with one or more spatial nodes in a sparse voxel octree of the 4D volume dataset based at least in part on a keyframe node prioritization, wherein the keyframe node prioritization is based at least in part on a screen-space-error (SSE) priority value, a temporal priority value, and a random selection priority value;
   storing received keyframe node data in a three-dimensional (3D) texture atlas storing voxel data of the 4D volume dataset;
   populating an array encoded sparse voxel octree of spatial nodes to be rendered with two keyframe nodes per spatial node to be rendered from the 3D texture atlas; and
   sending the array encoded sparse voxel octree for rendering on the 2D display.

2. The method of claim 1, wherein requesting the one or more keyframe nodes associated with the one or more spatial nodes in the sparse voxel octree of the 4D volume dataset based at least in part on the keyframe node prioritization comprises:
   determining for each spatial node in the sparse voxel octree a respective list of one or more keyframe nodes, wherein each keyframe node in each respective list references a unique point in time and has a same spatial location and same level of detail as its associated spatial node;
   storing the determined lists of keyframe nodes in the sparse voxel octree;
   assigning the keyframe node prioritization to each keyframe node in each respective list;
   populating a min-max heap data structure with at least a portion of the keyframe nodes based on the assigned keyframe node prioritization to generate a series of keyframe nodes suitable for rendering;
   determining any keyframe nodes of the series of keyframe nodes suitable for rendering for which keyframe node data is not stored in the 3D texture atlas; and
   sending network requests for keyframe node data of any keyframe nodes of the series of keyframe nodes suitable for rendering determined to not have keyframe node data stored in the 3D texture atlas.

3. The method of claim 2, wherein, for each keyframe node:
   the SSE priority value is based at least in part on a SSE of that keyframe node's associated spatial node; and
   the temporal priority value is based at least in part on that keyframe node's location in a timeline relative to the playhead location in the timeline.

4. The method of claim 3, wherein the random selection priority value is based at least in part on a stored random selection priority distribution.

5. The method of claim 2, wherein sending network requests for keyframe node data of any keyframe nodes of the series of keyframe nodes suitable for rendering determined to not have keyframe node data stored in the 3D texture atlas comprises sending network requests for keyframe node data of any keyframe nodes of the series of keyframe nodes suitable for rendering determined to not have keyframe node data stored in the 3D texture atlas sequentially in priority order.

6. The method of claim 1, wherein storing received keyframe node data in the 3D texture atlas comprises:
   receiving keyframe node data in response to a sent network request;
   determining whether the keyframe node data is no longer prioritized in response to receiving the keyframe node data;
   discarding the keyframe node data in response to determining the keyframe node data is no longer prioritized; and
   storing the keyframe node data in the 3D texture atlas in response to determining the keyframe node data is not no longer prioritized.

7. The method of claim 1, wherein populating the array encoded sparse voxel octree of spatial nodes to be rendered with two keyframe nodes per spatial node to be rendered from the 3D texture atlas comprises:
   selecting two keyframe nodes for each spatial node to be rendered from the keyframe node data stored in the 3D texture atlas based at least in part on a playhead location;
   determining whether the selected two keyframe nodes for each spatial node are both keyframe nodes of ancestor nodes to that spatial node;
   ignoring that spatial node for rendering in response to determining that the selected keyframe nodes for each spatial node are both keyframe nodes of ancestor nodes to that spatial node; and
   adding the selected two keyframe nodes for each spatial node to the array encoded sparse voxel octree in response to determining that the selected keyframe nodes for each spatial node are not both keyframe nodes of ancestor nodes to that spatial node.

8. The method of claim 7, wherein selecting the two keyframe nodes for each spatial node to be rendered from the keyframe node data stored in the 3D texture atlas based at least in part on the playhead location comprises, for each spatial node to be rendered and on each respective side of the playhead location:

determining, from the keyframe node data stored in the 3D texture atlas, a keyframe node of the spatial node on that side of the playhead location having a smallest keyframe node distance from the playhead location;

setting the determined keyframe node of the spatial node as a selected keyframe node;

determining whether an ancestor node of the spatial node has a keyframe node stored in the 3D texture atlas with a keyframe node distance from the playhead location on that side of the playhead smaller than the keyframe node distance for the selected keyframe node; and in response to the ancestor node of the spatial node has a keyframe node stored in the 3D texture atlas having a keyframe node distance from the playhead location on that side of the playhead location smaller than the keyframe node distance for the selected keyframe node, setting the keyframe node of the ancestor node of the spatial node having the keyframe node distance from the playhead location on that side of the playhead location smaller than the keyframe node distance for the selected keyframe node as the selected keyframe node.

9. The method of claim 8, wherein the keyframe node distance of the ancestor node of the spatial node is biased to be longer than its actual keyframe node distance.

10. A computing device, comprising:

a processor configured to perform operations comprising:

requesting one or more keyframe nodes associated with one or more spatial nodes in a sparse voxel octree of a time-dynamic (4D) volume dataset based at least in part on a keyframe node prioritization, wherein the keyframe node prioritization is based at least in part on a screen-space-error (SSE) priority value, a temporal priority value, and a random selection priority value;

storing received keyframe node data in a three-dimensional (3D) texture atlas storing voxel data of the 4D volume dataset;

populating an array encoded sparse voxel octree of spatial nodes to be rendered with two keyframe nodes per spatial node to be rendered from the 3D texture atlas; and sending the array encoded sparse voxel octree for rendering on a 2D display.

11. The computing device of claim 10, wherein the processor is configured to perform operations such that requesting the one or more keyframe nodes associated with the one or more spatial nodes in the sparse voxel octree of the 4D volume dataset based at least in part on the keyframe node prioritization comprises:

determining for each spatial node in the sparse voxel octree a respective list of one or more keyframe nodes, wherein each keyframe node in each respective list references a unique point in time and has a same spatial location and same level of detail as its associated spatial node;

storing the determined lists of keyframe nodes in the sparse voxel octree;

assigning the keyframe node prioritization to each keyframe node in each respective list;

populating a min-max heap data structure with at least a portion of the keyframe nodes based on the assigned keyframe node prioritization to generate a series of keyframe nodes suitable for rendering;

determining any keyframe nodes of the series of keyframe nodes suitable for rendering for which keyframe node data is not stored in the 3D texture atlas; and sending network requests for keyframe node data of any keyframe nodes of the series of keyframe nodes suitable for rendering determined to not have keyframe node data stored in the 3D texture atlas.

12. The computing device of claim 11, wherein the processor is configured to perform operations such that, for each keyframe node:

the SSE priority value is based at least in part on a SSE of that keyframe node's associated spatial node; and the temporal priority value is based at least in part on that keyframe node's location in a timeline relative to the playhead location in the timeline.

13. The computing device of claim 12, wherein the processor is configured to perform operations such that the random selection priority value is based at least in part on a stored random selection priority distribution.

14. The computing device of claim 11, wherein the processor is configured to perform operations such that sending network requests for keyframe node data of any keyframe nodes of the series of keyframe nodes suitable for rendering determined to not have keyframe node data stored in the 3D texture atlas comprises sending network requests for keyframe node data of any keyframe nodes of the series of keyframe nodes suitable for rendering determined to not have keyframe node data stored in the 3D texture atlas sequentially in priority order.

15. The computing device of claim 10, wherein the processor is configured to perform operations such that storing received keyframe node data in the 3D texture atlas comprises:

receiving keyframe node data in response to a sent network request;

determining whether the keyframe node data is no longer prioritized in response to receiving the keyframe node data;

discarding the keyframe node data in response to determining the keyframe node data is no longer prioritized; and storing the keyframe node data in the 3D texture atlas in response to determining the keyframe node data is not no longer prioritized.

16. The computing device of claim 10, wherein the processor is configured to perform operations such that populating the array encoded sparse voxel octree of spatial nodes to be rendered with two keyframe nodes per spatial node to be rendered from the 3D texture atlas comprises:

selecting two keyframe nodes for each spatial node to be rendered from the keyframe node data stored in the 3D texture atlas based at least in part on a playhead location;

determining whether the selected two keyframe nodes for each spatial node are both keyframe nodes of ancestor nodes to that spatial node;

ignoring that spatial node for rendering in response to determining that the selected keyframe nodes for each spatial node are both keyframe nodes of ancestor nodes to that spatial node; and adding the selected two keyframe nodes for each spatial node to the array encoded sparse voxel octree in response to determining that the selected keyframe nodes for each spatial node are not both keyframe nodes of ancestor nodes to that spatial node.

17. The computing device of claim 16, wherein the processor is configured to perform operations such that selecting the two keyframe nodes for each spatial node to be rendered from the keyframe node data stored in the 3D texture atlas based at least in part on the playhead location comprises, for each spatial node to be rendered and on each respective side of the playhead location:
determining, from the keyframe node data stored in the 3D texture atlas, a keyframe node of the spatial node on that side of the playhead location having a smallest keyframe node distance from the playhead location;
setting the determined keyframe node of the spatial node as a selected keyframe node;
determining whether an ancestor node of the spatial node has a keyframe node stored in the 3D texture atlas with a keyframe node distance from the playhead location on that side of the playhead smaller than the keyframe node distance for the selected keyframe node; and
in response to the ancestor node of the spatial node has a keyframe node stored in the 3D texture atlas having a keyframe node distance from the playhead location on that side of the playhead location smaller than the keyframe node distance for the selected keyframe node, setting the keyframe node of the ancestor node of the spatial node having the keyframe node distance from the playhead location on that side of the playhead location smaller than the keyframe node distance for the selected keyframe node as the selected keyframe node.

18. The computing device of claim 17, wherein the processor is configured to perform operations such that the keyframe node distance of the ancestor node of the spatial node is biased to be longer than its actual keyframe node distance.

19. A non-transitory processor readable medium having stored thereon processor-executable instructions configured to cause a processor to perform operations comprising:
requesting one or more keyframe nodes associated with one or more spatial nodes in a sparse voxel octree of a time-dynamic (4D) volume dataset based at least in part on a keyframe node prioritization, wherein the keyframe node prioritization is based at least in part on a screen-space-error (SSE) priority value, a temporal priority value, and a random selection priority value;
storing received keyframe node data in a three-dimensional (3D) texture atlas storing voxel data of the 4D volume dataset;
populating an array encoded sparse voxel octree of spatial nodes to be rendered with two keyframe nodes per spatial node to be rendered from the 3D texture atlas; and
sending the array encoded sparse voxel octree for rendering on a 2D display.

20. The non-transitory processor readable medium of claim 19, wherein the stored processor-executable instructions are configured to cause a processor to perform operations such that requesting the one or more keyframe nodes associated with the one or more spatial nodes in the sparse voxel octree of the 4D volume dataset based at least in part on the keyframe node prioritization comprises:
determining for each spatial node in the sparse voxel octree a respective list of one or more keyframe nodes, wherein each keyframe node in each respective list references a unique point in time and has a same spatial location and same level of detail as its associated spatial node;
storing the determined lists of keyframe nodes in the sparse voxel octree;
assigning the keyframe node prioritization to each keyframe node in each respective list;
populating a min-max heap data structure with at least a portion of the keyframe nodes based on the assigned keyframe node prioritization to generate a series of keyframe nodes suitable for rendering;
determining any keyframe nodes of the series of keyframe nodes suitable for rendering for which keyframe node data is not stored in the 3D texture atlas; and
sending network requests for keyframe node data of any keyframe nodes of the series of keyframe nodes suitable for rendering determined to not have keyframe node data stored in the 3D texture atlas.

21. The non-transitory processor readable medium of claim 20, wherein the stored processor-executable instructions are configured to cause a processor to perform operations such that, for each keyframe node:
the SSE priority value is based at least in part on a SSE of that keyframe node's associated spatial node; and
the temporal priority value is based at least in part on that keyframe node's location in a timeline relative to the playhead location in the timeline.

22. The non-transitory processor readable medium of claim 21, wherein the stored processor-executable instructions are configured to cause a processor to perform operations such that wherein the random selection priority value is based at least in part on a stored random selection priority distribution.

23. The non-transitory processor readable medium of claim 20, wherein the stored processor-executable instructions are configured to cause a processor to perform operations such that sending network requests for keyframe node data of any keyframe nodes of the series of keyframe nodes suitable for rendering determined to not have keyframe node data stored in the 3D texture atlas comprises sending network requests for keyframe node data of any keyframe nodes of the series of keyframe nodes suitable for rendering determined to not have keyframe node data stored in the 3D texture atlas sequentially in priority order.

24. The non-transitory processor readable medium of claim 19, wherein the stored processor-executable instructions are configured to cause a processor to perform operations such that storing received keyframe node data in the 3D texture atlas comprises:
receiving keyframe node data in response to a sent network request;
determining whether the keyframe node data is no longer prioritized in response to receiving the keyframe node data;
discarding the keyframe node data in response to determining the keyframe node data is no longer prioritized; and
storing the keyframe node data in the 3D texture atlas in response to determining the keyframe node data is not no longer prioritized.

25. The non-transitory processor readable medium of claim 19, wherein the stored processor-executable instructions are configured to cause a processor to perform operations such that populating the array encoded sparse voxel octree of spatial nodes to be rendered with two keyframe nodes per spatial node to be rendered from the 3D texture atlas comprises:

selecting two keyframe nodes for each spatial node to be rendered from the keyframe node data stored in the 3D texture atlas based at least in part on a playhead location;

determining whether the selected two keyframe nodes for each spatial node are both keyframe nodes of ancestor nodes to that spatial node;

ignoring that spatial node for rendering in response to determining that the selected keyframe nodes for each spatial node are both keyframe nodes of ancestor nodes to that spatial node; and adding the selected two keyframe nodes for each spatial node to the array encoded sparse voxel octree in response to determining that the selected keyframe nodes for each spatial node are not both keyframe nodes of ancestor nodes to that spatial node.

26. The non-transitory processor readable medium of claim 25, wherein the stored processor-executable instructions are configured to cause a processor to perform operations such that selecting the two keyframe nodes for each spatial node to be rendered from the keyframe node data stored in the 3D texture atlas based at least in part on the playhead location comprises, for each spatial node to be rendered and on each respective side of the playhead location:

determining, from the keyframe node data stored in the 3D texture atlas, a keyframe node of the spatial node on that side of the playhead location having a smallest keyframe node distance from the playhead location;

setting the determined keyframe node of the spatial node as a selected keyframe node;

determining whether an ancestor node of the spatial node has a keyframe node stored in the 3D texture atlas with a keyframe node distance from the playhead location on that side of the playhead smaller than the keyframe node distance for the selected keyframe node; and in response to the ancestor node of the spatial node has a keyframe node stored in the 3D texture atlas having a keyframe node distance from the playhead location on that side of the playhead location smaller than the keyframe node distance for the selected keyframe node, setting the keyframe node of the ancestor node of the spatial node having the keyframe node distance from the playhead location on that side of the playhead location smaller than the keyframe node distance for the selected keyframe node as the selected keyframe node.

27. The non-transitory processor readable medium of claim 26, wherein the stored processor-executable instructions are configured to cause a processor to perform operations such that the keyframe node distance of the ancestor node of the spatial node is biased to be longer than its actual keyframe node distance.

* * * * *